Figure 1:
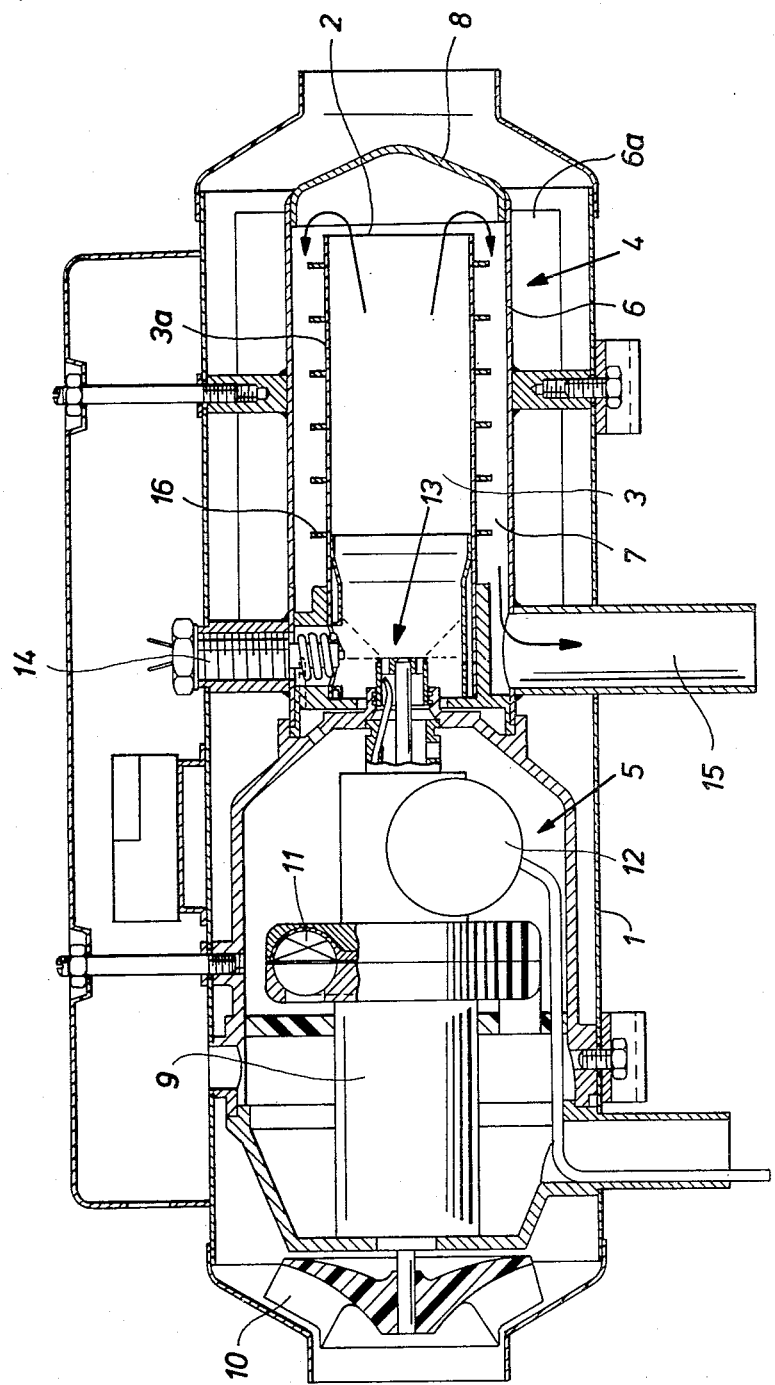

United States Patent [19]

Friedl et al.

[11] 4,216,759
[45] Aug. 12, 1980

[54] AUXILIARY HEATER FOR VEHICLES

[75] Inventors: Reiner Friedl, Starnberg; Dieter Zeus, Icking; Friedrich Widemann, Munich; Werner Hornfeck, Unterpfaffenhofen, all of Fed. Rep. of Germany

[73] Assignee: Webasto-Werk W. Baier GmbH & Co., Fed. Rep. of Germany

[21] Appl. No.: 899,158

[22] Filed: Apr. 24, 1978

[30] Foreign Application Priority Data

Apr. 23, 1977 [DE] Fed. Rep. of Germany ....... 2718215

[51] Int. Cl.² ............................................. F24H 3/06
[52] U.S. Cl. ........................... 126/110 B; 237/12.3 C; 165/135; 165/155
[58] Field of Search ............... 237/12.3 C; 126/110 B; 165/142, 135, 155

[56] References Cited

U.S. PATENT DOCUMENTS

| 1,947,716 | 2/1934 | Hyatt | 237/12.3 C X |
|---|---|---|---|
| 2,579,507 | 12/1951 | MacCracken | 126/110 R X |
| 3,133,527 | 5/1964 | Mizer | 237/12.3 C X |
| 3,479,689 | 11/1969 | Kurzke et al. | 165/142 X |
| 3,607,125 | 9/1971 | Kydd | 165/142 X |
| 3,779,229 | 12/1973 | Volbehr | 126/110 B |

Primary Examiner—Lloyd L. King
Assistant Examiner—William E. Tapolcai
Attorney, Agent, or Firm—Craig & Antonelli

[57] ABSTRACT

An auxiliary heater device comprises a tubular combustion chamber surrounded by a heat exchanger 50 as to define a gap therebetween. The peripheral wall of the combustion chamber is provided with a plurality of circumferential projections that extend into the gap in a manner that reduces direct contact heat exchange between the combustion gases flowing through the gap and the peripheral wall by blocking axial flow of the gases along the wall in contact therewith and by deflecting these gases toward the heat exchanger pipe.

4 Claims, 2 Drawing Figures

AUXILIARY HEATER FOR VEHICLES

The present invention relates to an auxiliary heater for vehicles operated with fluid i.e. liquid or gaseous fuel and comprising a casing containing a tubular combustion chamber open at one end, a heat exchanger for the medium to be heated and a burner unit, the heat exchanger comprising a tube closed at one end and surrounding concentrically the combustion chamber and delimiting with the peripheral wall thereof an annular gap which is traversed by hot combustion gases.

In known heating devices of the kind set forth the heating of the tube of the heat exchanger takes place in two ways namely by the hot combustion gases passing said annular gap and by heat radiation from the peripheral wall of the combustion chamber which is partly in glowing condition. For obtaining a good efficiency the temperature of the combustion gases at the exit from said annular gap should be as low as possible which is also feasible in view of the heat insulation of the exhaust pipe. However, the combustion gases which after exiting from the open end of the combustion chamber pass along the inner wall of the heat exchanger pipe and emit heat to said wall but at the same time are considerably heated up by convection at the outer wall of the peripheral wall of the combustion chamber. Along the relatively short way through the annular gap the heated combustion gases have no opportunity to emit much of their heat to the heat exchanger pipe so that the exit temperature of the combustion gases is relatively high. This drawback cannot be cured by a heat insulation of the peripheral wall of the combustion chamber as the heating of the heat exchanger pipe takes place besides others also by heat radiation from the peripheral wall of the combustion chamber.

It is an object of the present invention to provide an auxiliary heater of the kind set forth which has relatively low exit temperatures of the combustion gas when leaving the heat exchanger, and therefore a relatively high efficiency.

According to the invention this object is attained by arranging at the outer surface of the peripheral wall of the combustion chamber projections or protrusions which prevent that the combustion gas flow gets in direct contact with said wall.

As a result of the proposed arrangement, the combustion gases passing through the annular gap are heated up to much lesser degree by the peripheral wall of the combustion chamber than with known devices without, however, impairing the heat radiation from said peripheral wall to the inner wall of the heat exchanger. In addition the restrictions created by the projections within the annular gap provide locally an increased flow velocity and, therewith, an improved heat transmission.

Preferably the projections are annular and extend about the periphery of the combustion chamber peripheral wall i.e. normal to the flow direction of the combustion gases within the annular gap. Preferably a plurality of radially extending annular projections are spaced along the length of the combustion chamber. The width of the projections can be up to 50% of the width of the annular gap. In a practical embodiment the width of the projections is 6 millimeters.

These annular projections cannot be compared with the radial ribs of a heat exchanger pipe in which the ribs or fins serve for increasing the heat-absorbing or heat-emitting surface of the pipe and arranged in parallel to the flow direction of the medium passing through the ribs or fins.

For decreasing the flow resistance the outer peripheral edges of the annular projections can be bent in the flow direction of the combustion gases.

The following is a description by way of example only and with reference to the accompanying drawings of a preferred embodiment of the invention and a modification thereof.

Figure 2:
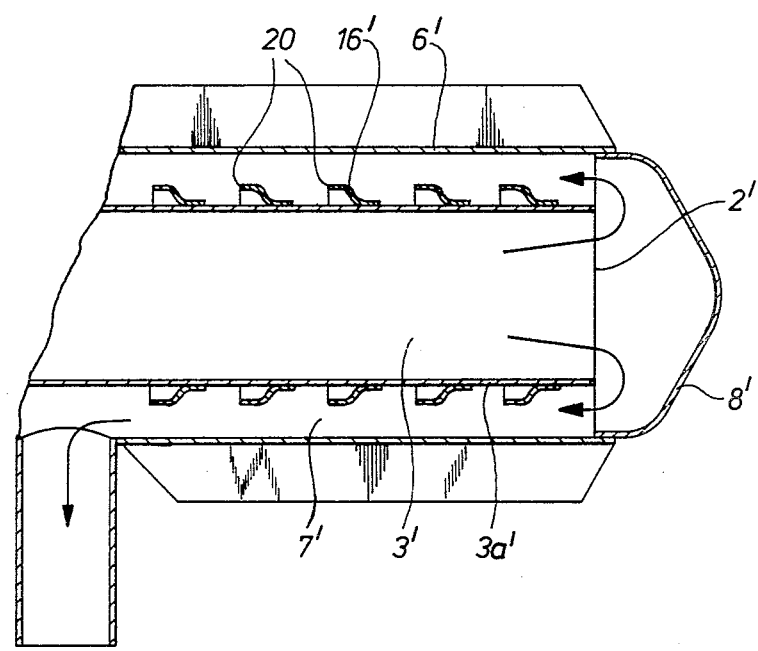

In the drawings:

FIG. 1 is a longitudinal sectional view of an auxiliary heating device according to the invention, and FIG. 2 is a partial longitudinal sectional view of a combustion chamber and the surrounding heat exchanger of a modification of the FIG. 1 embodiment.

Referring now to FIG. 1 there is shown a casing 1 which contains a tubular combustion chamber 3 open at one end 2, a heat exchanger 4 for the heating air and a burner unit 5. The heat exchanger 4 comprises a pipe 6 which surrounds concentrically the combustion chamber 3 to define an annular gap 7. The end of the pipe 6 adjacent to the end 2 of the combustion chamber 3 is closed by a cover 8. The burner unit comprises an electric motor 9, for driving a fan 10 for the heating air, a blower 11 for the combustion air, a fuel pump 12 and a rotary atomizer 13 projecting into the combustion chamber 3. A spark or glow plug 14 is provided in combustion chamber 3.

An exhaust pipe 15 extends from the end of the annular gap 7 opposite to the open end 2 of combustion/chamber 3. The outer surface of the heat exchanger pipe 6 is provided with longitudinally extending fins 6a.

The hot combustion gases created by the combustion of the fuel in the combustion chamber 3 flow in the direction of the arrows from the combustion chamber 3 through the annular gap 7 towards the exhaust pipe 15. The pipe 6 of the heat exchanger 4 is heated by the hot combustion gases and by heat radiation from the hot and partly glowing peripheral wall 3a of the combustion chamber 3. According to the invention the outer surface of the peripheral wall 3a of the combustion chamber 3 is provided with projections 16 which have the effect that the combustion gases are not heated much by the hot peripheral wall 3a. In the embodiment of FIG. 1 these projections are in the shape of radial rings 16 which are spaced along the length of the combustion chamber 3. These projections 16 prevent the flow of combustion gases along the outer surface of the peripheral wall 3a in direct contact therewith (except to some extent in the gaps between the projections 16) since, as is apparent from the drawings, gases flowing into gap 7 will be blocked from flowing along wall 3a and will be deflected toward pipe 6 which transfers heat to the air flow produced by fan 10. However, the heat radiation from the peripheral wall 3a to pipe 6 of the heat exchanger 4 is not impaired by said projections 16. It may even be that the heat radiation is increased by the projections 16 because they prevent a cooling of the peripheral wall 3a by the passing combustion gases so that the temperature of the peripheral wall is increased.

In FIG. 2 same or similar parts are designated with the same reference numbers but with a prime. In this embodiment the peripheral edges 20 of the annular projections 16' are bent in the flow direction of the combustion gases withing the annular gap 7' in order to decrease the flow resistance. The bent edges 20 do not impair the heat radiation from the peripheral wall 3a' of the combustion chamber 3' as they are themselves heated by heat radiation from the peripheral wall 3a'.

What we claim:

1. Auxiliary heating device for fluid fuels, particularly for vehicles, comprising a casing which contains a tubular combustion chamber having a peripheral wall open at one end, a heat exchanger for the medium to be heated mounted in said casing in a manner forming a path for said medium along an outer surface thereof, and a burner unit, said heat exchanger comprising a pipe closed at one end and concentrically surrounding the combustion chamber to form an annular gap between said heat exchanger and a peripheral wall of the combustion chamber, which is traversed by hot combustion gases and in which projections are provided on an outer surface of the peripheral wall of the combustion chamber which prevent the combustion gases flowing through said gap from passing axially along said peripheral wall in direct contact therewith and which deflect said combustion gases toward said heat exchanger pipe.

2. The invention according to claim 1, wherein the said projections are annular and extend over the periphery of the peripheral wall of the combustion chamber.

3. The invention according to claim 2, wherein a plurality of annular projections are arranged in spaced relationship along the length of the combustion chamber on the peripheral wall thereof.

4. The invention according to claim 2, wherein the outer peripheral edges of the annular projections are bent in the flow direction of the combustion gases through said gap.

* * * * *